(12) United States Patent
Lv et al.

(10) Patent No.: US 11,919,399 B2
(45) Date of Patent: Mar. 5, 2024

(54) HYBRID POWER SYSTEM

(71) Applicant: WEICHAI POWER CO., LTD., Shandong (CN)

(72) Inventors: Fenglong Lv, Weifang (CN); Lei Zhang, Weifang (CN); Yamei Xu, Weifang (CN); Fei Wang, Weifang (CN); Zhengxing Zhang, Weifang (CN); Bin Zhang, Weifang (CN)

(73) Assignee: WEICHAI POWER CO., LTD., Weifang (CN)

( * ) Notice: Subject to any disclaimer, the term of this patent is extended or adjusted under 35 U.S.C. 154(b) by 0 days.

(21) Appl. No.: 17/599,983

(22) PCT Filed: Apr. 12, 2019

(86) PCT No.: PCT/CN2019/082386
§ 371 (c)(1),
(2) Date: Sep. 29, 2021

(87) PCT Pub. No.: WO2020/206668
PCT Pub. Date: Oct. 15, 2020

(65) Prior Publication Data
US 2022/0126670 A1 Apr. 28, 2022

(51) Int. Cl.
*B60K 6/365* (2007.10)
*B60K 6/26* (2007.10)
(52) U.S. Cl.
CPC ............... *B60K 6/26* (2013.01); *B60K 6/365* (2013.01); *B60Y 2200/92* (2013.01)
(58) Field of Classification Search
CPC ... B60K 6/26; B60K 6/36; B60K 6/40; B60K 6/42; B60K 6/48; B60K 6/46;
(Continued)

(56) References Cited

U.S. PATENT DOCUMENTS

| 2003/0054910 A1* | 3/2003 | Nett | H02K 7/14 |
| | | | 903/910 |
| 2012/0181957 A1* | 7/2012 | Bachmaier | H02K 16/025 |
| | | | 310/74 |
| 2015/0288249 A1* | 10/2015 | Hemphill | H02K 7/116 |
| | | | 310/83 |

FOREIGN PATENT DOCUMENTS

| CN | 2552241 Y | 5/2003 |
| CN | 102398506 A | 4/2012 |

(Continued)

OTHER PUBLICATIONS

JP 2013162613 machine translation filed Jan. 11, 2023 (Year: 2023).*

(Continued)

*Primary Examiner* — Tisha D Lewis
(74) *Attorney, Agent, or Firm* — Fenwick & West LLP

(57) ABSTRACT

A hybrid power system includes an engine and a motor. A motor stator of the motor is connected with a drive shaft of a motor vehicle through a transmission mechanism, so that the motor stator can also rotate relative to the chassis and other structures of the motor vehicle, thus, the hybrid power system composed of the engine and the motor can meet the application of various working conditions such as starting, idling, forwarding and reversing of the motor vehicle, and the number of parts of the hybrid system is greatly reduced, thereby simplifying the overall structure of the hybrid power system.

4 Claims, 8 Drawing Sheets

(58) Field of Classification Search
CPC .... B60K 6/442; B60K 6/365; B60Y 2200/91;
B60Y 2200/92; B60Y 2410/102
See application file for complete search history.

(56) References Cited

FOREIGN PATENT DOCUMENTS

| | | | | |
|---|---|---|---|---|
| CN | 103072459 A | 5/2013 | | |
| DE | 3338548 A1 | 5/1985 | | |
| DE | 4407666 A1 | 9/1995 | | |
| DE | 10015912 A1 | 10/2001 | | |
| DE | 19539571 C2 | 6/2003 | | |
| GB | 2463502 A | 3/2010 | | |
| GB | 2479946 A | * 11/2011 | ............ | B60K 6/105 |
| GB | 2483673 A | 3/2012 | | |
| JP | 05022922 A | * 1/1993 | ............ | H02K 37/02 |
| JP | H09-275603 A | 10/1997 | | |
| JP | 2013-162613 A | 8/2013 | | |
| WO | WO 2005/030517 A1 | 4/2005 | | |

OTHER PUBLICATIONS

PCT International Search Report and Written Opinion, PCT/CN2019/082386, dated Jan. 23, 2020, 11 pgs.

European Patent Office, Extended European Search Report and Opinion, EP Patent Application No. 19923836.1, dated Sep. 21, 2022, seven pages.

Japan Patent Office, Office Action, JP Patent Application No. 2021-559553, dated Nov. 22, 2022, ten pages.

* cited by examiner

HYBRID POWER SYSTEM

The present application is a 35 U.S.C. 371 Patent Application of PCT Application No. PCT/CN2019/082386, filed on Apr. 12, 2019, which is incorporated herein by reference in its entirety.

FIELD

The present application relates to the technical field of vehicle engineering, and in particular to a hybrid power system.

BACKGROUND

With the continuous development of vehicle engineering technology, a driving method of a motor vehicle has developed from a traditional pure internal combustion engine driving to a hybrid driving and a pure electric driving. Gasoline-electric hybrid driving has become the mainstream new energy vehicle driving method since the gasoline-electric hybrid driving method has a relatively mature power system.

In a gasoline-electric hybrid vehicle, a hybrid power system is the main factor that determines key parameters such as operation smoothness and efficiency of energy utilization.

A hybrid power system in the conventional art mainly includes a series system solution, a parallel system solution, a series-parallel system solution, and a series-parallel system solution including structure such as a planetary row. However, there are too many parts and components in these hybrid power systems, and then these hybrid power systems are relatively complex in structure, and have more failure points.

SUMMARY

In order to solve the above technical issues, a hybrid power system is provided according to the present application, so as to simplify the structure of the hybrid power system and reduce the failure points of the hybrid power system.

In order to achieve the above objects, the following technical solutions are provided according to the embodiments of the present application.

A hybrid power system is applied to a motor vehicle, and the hybrid power system includes an engine and a motor; the motor includes a motor rotor, a motor stator, and a motor controller;

- an output shaft of the engine is connected to a center shaft of the motor rotor; two ends of the center shaft of the motor rotor are respectively connected to a motor bearing for supporting the motor rotor;
- the motor controller is connected to the motor stator for providing a driving current for the motor stator;
- the motor stator is connected to a driving shaft of the motor vehicle through a transmission mechanism, so that when the driving shaft rotates, the motor stator is driven to rotate;
- the motor is configured to determine an output torque according to a rotation speed of the motor and transmit the output torque to the driving shaft; the rotation speed of the motor is equal to a difference between a rotation speed of the motor rotor and a rotation speed of the motor stator.

In an embodiment, the transmission mechanism is a flange plate.

In an embodiment, an outer edge of the flange plate is detachably connected to the motor stator; a connecting hole of the flange plate is detachably connected to the driving shaft.

In an embodiment, an internal gear and an external gear are provided on the flange plate;
- the internal gear is provided in the connecting hole of the flange plate to cooperate with a gear structure on the driving shaft;
- the external gear is provided on an edge position of the flange plate to cooperate with a gear structure on the motor stator.

In an embodiment, the motor stator is clamped on or welded to the outer edge of the flange plate, and/or the connecting hole of the flange plate is clamped on or welded to the driving shaft.

In an embodiment, a groove is defined on the flange plate;
- the groove is located on a side, facing the motor rotor, of the flange plate, and is configured to bear the motor bearing; the connecting hole of the flange plate is defined on the bottom of the groove.

In an embodiment, the two ends of the center shaft of the motor rotor are respectively in interference fit with an inner ring of the motor bearing.

In an embodiment, a motor casing of the motor is fixedly connected to a chassis of the motor vehicle.

In an embodiment, an area, facing away from the groove, of the flange plate is a protruding structure; a radial cross section of the protruding structure is non-circular.

It can be seen from the above technical solutions that the hybrid power system is provided according to the embodiments of the present application, and the hybrid power system includes the engine and the motor; the motor stator of the motor is connected to the driving shaft of the motor vehicle through the transmission mechanism, so that the motor stator may also rotate relative to the chassis or other structures of the motor vehicle, so that the hybrid power system including the engine and the motor can meet the application of various operating conditions such as starting, idling, forward travelling and reversing of the motor vehicle, which greatly reduces the number of parts and components of the hybrid power system, thereby simplifying the overall structure of the hybrid power system and reducing the failure points of the hybrid power system.

BRIEF DESCRIPTION OF THE DRAWINGS

For more clearly illustrating embodiments of the present application or the technical solutions in the conventional technology, drawings referred to for describing the embodiments or the conventional technology will be briefly described hereinafter. Apparently, drawings in the following description are only examples of the present application, and for the person skilled in the art, other drawings may be obtained based on the provided drawings without any creative efforts.

DETAILED DESCRIPTION OF THE EMBODIMENTS

As mentioned in the background technology, in the conventional art, there are too many parts and components in a hybrid power system, which causes a relatively complex structure. In addition, the complex structure may cause more failure points in the hybrid power system.

Figure 1:
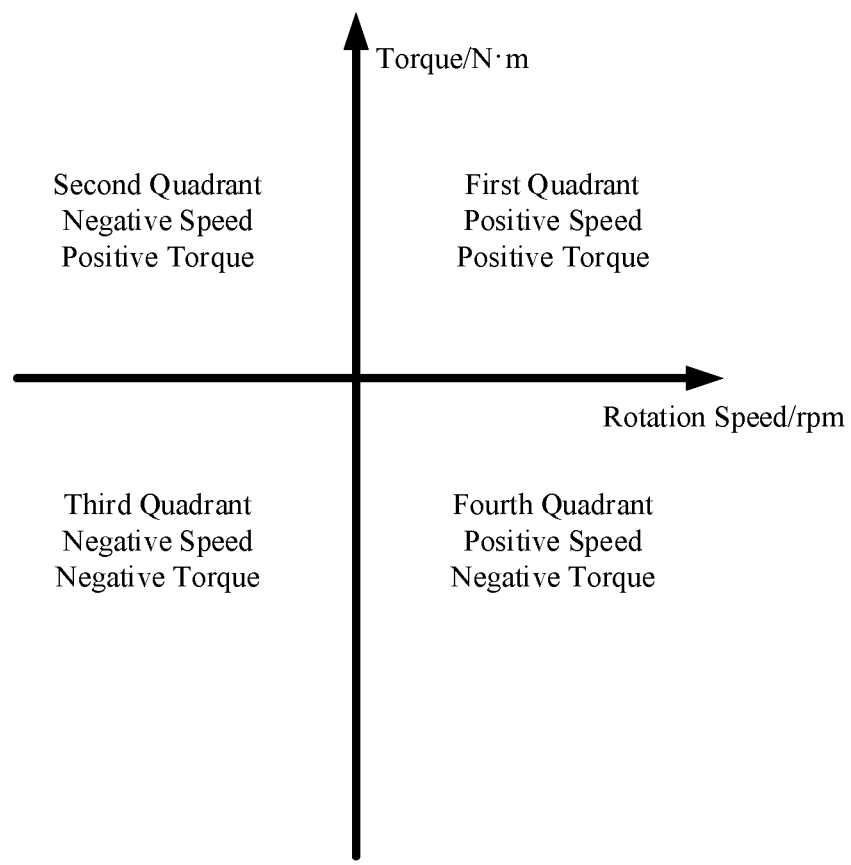
FIG. 1 is a schematic definition view of a speed direction and a torque direction of a motor.

Hybrid power systems in the conventional art are briefly introduced hereinafter. In order to facilitate the description of a speed direction and a torque direction of the engine and the motor of these hybrid power systems under various working conditions, in the present application, the speed direction and the torque direction of the motor of the hybrid power system are defined. Referring to FIG. 1, in FIG. 1, a horizontal axis represents the speed of the motor in revolutions per minute (rpm); a vertical axis represents the torque output by the motor in newton meter (N·m). In a coordinate system in FIG. 1, values in the first quadrant indicates that the speed of the motor is positive and the torque of the motor is positive; values in the second quadrant indicates that the speed of the motor is negative; the torque of the motor is positive; values in the third quadrant indicates that the speed of the motor and the torque of the motor are both negative; values in the fourth quadrant indicates that the speed of the motor is positive and the torque of the motor is negative. It should also be noted that the speed of the motor takes a forward direction of the vehicle as a positive value; a positive torque of the motor indicates that the torque direction is the same as the forward direction of the vehicle; a negative torque of the motor indicates that the torque direction is opposite to the forward direction of the vehicle.

Figure 2:
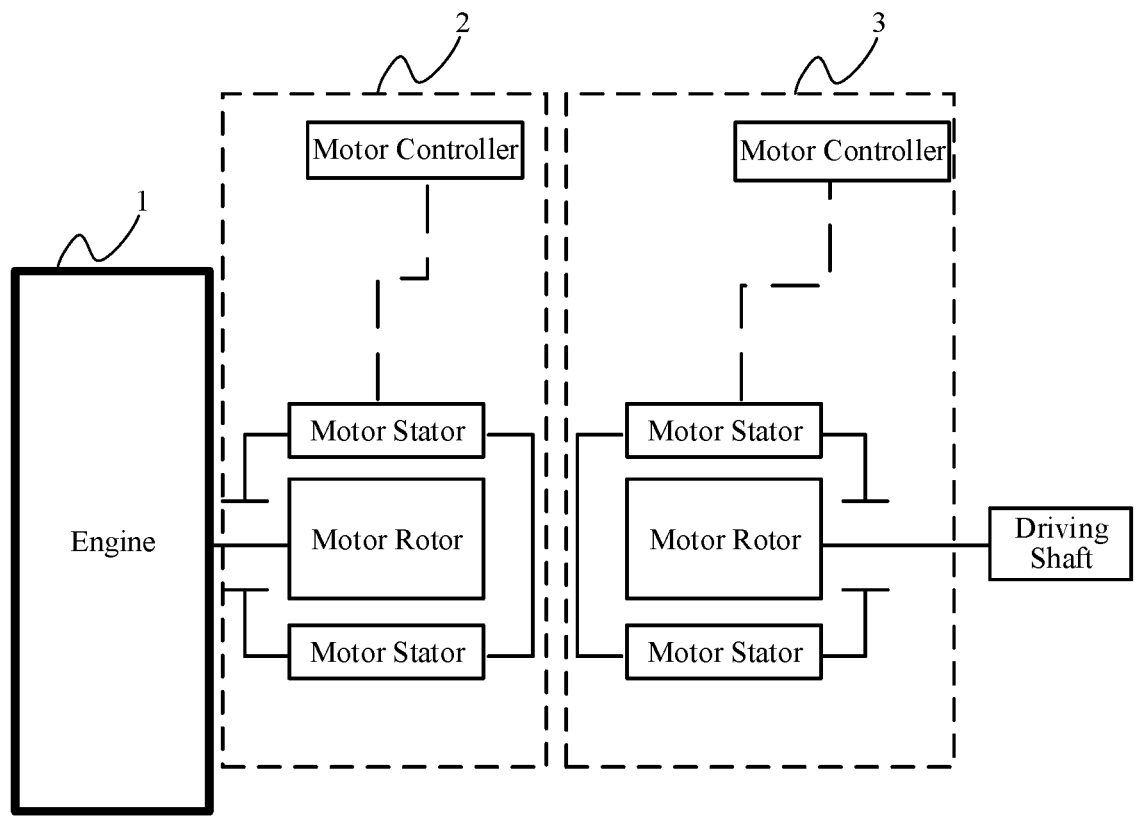
FIG. 2 to FIG. 5 are schematic structural views of structures of hybrid power systems in the conventional art.

Referring to FIG. 2, it shows a series system solution of the hybrid power system in the conventional art. The solution mainly includes an engine 1, a generator 2, a driving motor 3, and etc. The generator 2 is directly connected to an output shaft of the engine 1. The engine 1 is not configured to directly drive a motor vehicle, but to provide the power required by the generator 1. The generator 2 is configured to start the engine 1 and generate electricity; the driving motor 3 is configured to drive the motor vehicle to travel (driving energy comes from an on-board power battery or power generated by the generator) and to be responsible for a kinetic energy recovery process of the motor vehicle.

During a start process of the engine 1, the generator 2 drives the engine 1 to start; when the vehicle is parked, the generator 2 and the engine 1 rotate at the same speed, and the rotation speed of the driving motor 3 is 0 rpm; during a start-up process or a travelling process of the vehicle, the rotation speed of the driving motor 3 starts to increase from 0 rpm, and the rotation speed of the motor is proportional to the speed of the vehicle; during a braking process of the vehicle, it is common that the engine 1 is stopped, so the rotation speed of the generator is 0 rpm, and the rotation speed of the driving motor is gradually decreased to 0 rpm; when the vehicle is reversing, the driving motor rotates reversely.

In this solution, the hybrid power system includes the engine 1, the generator 2, and the driving motor 3. The assembly is relatively long in size and relatively high in cost. The rotation speed and torque of the generator 2 during the operation process involve the first quadrant (only during the start process of the engine 1) and the fourth quadrant; the rotation speed and torque of the driving motor 3 during operation process involve the first, the third and the fourth quadrants.

Figure 3:
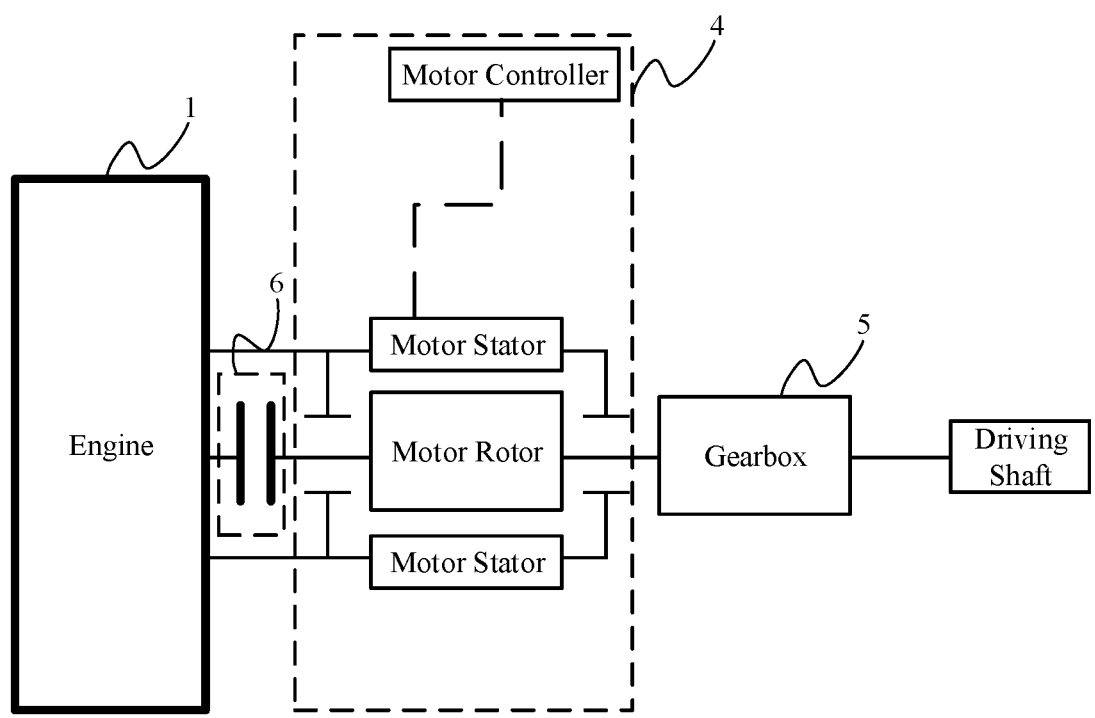

Referring to FIG. 3, it shows a parallel system solution of the hybrid power system in the conventional art. The solution mainly includes an engine 1, a clutch 6, a motor 4, a gearbox 5, and etc. The engine 1 is connected to/disconnected from the motor 4 through the clutch 6, and the motor 4 is connected to a driving shaft of the vehicle through the gearbox 5. The engine 1 is configured to perform direct driving, joint driving and parking for electricity generation of the vehicle; the clutch 6 is configured to control engagement and disengagement of the engine 1 and the motor 4; the motor 4 is configured to perform direct driving, joint driving, braking energy recovery and parking for electricity generation of the vehicle; the gearbox 5 is configured to shift gears to match a rotation speed of the motor 4, a rotation speed of the engine 1 and a speed of the vehicle.

During a start process of the engine 1, the gearbox is in a neutral position, the clutch is engaged, and the motor drives the engine 1 to start; when the vehicle is parked, the clutch is disengaged, the rotation speed of the motor rotate is 0 rpm, and the gearbox is in low-gear positions or the neutral position; during a start-up process or a travelling process of the vehicle, the gearbox is in low-gear positions, the rotation speed of the motor starts to increase from 0 rpm (the clutch is disengaged), the gear position of the gearbox is shifted according to a strategy, and the engine 1 is involved in driving (the clutch is engaged); during a braking process of the vehicle, the clutch is disengaged, torque of the motor is negative and the rotation speed of the motor gradually decrease to zero; when the vehicle is reversing, the clutch is disengaged, the gearbox is in low-gear positions, the motor rotates reversely (or the gearbox is in a reverse gear position, the motor rotates forwardly).

In this solution, the hybrid power system includes the engine 1, the clutch, the motor and the gearbox. The assembly has many pieces and relatively long in size. The operation process involves gear position shifting of the gearbox, which may easily cause abrupt shifting, reduce the comfort performance. The control strategy is complicated, and the overall cost is relatively high. The rotation speed and the torque of the motor during the operation process are in the first quadrant, the third quadrant (which is not involved in a case that the gearbox is provided with a reverse gear) and the fourth quadrant.

Figure 4:
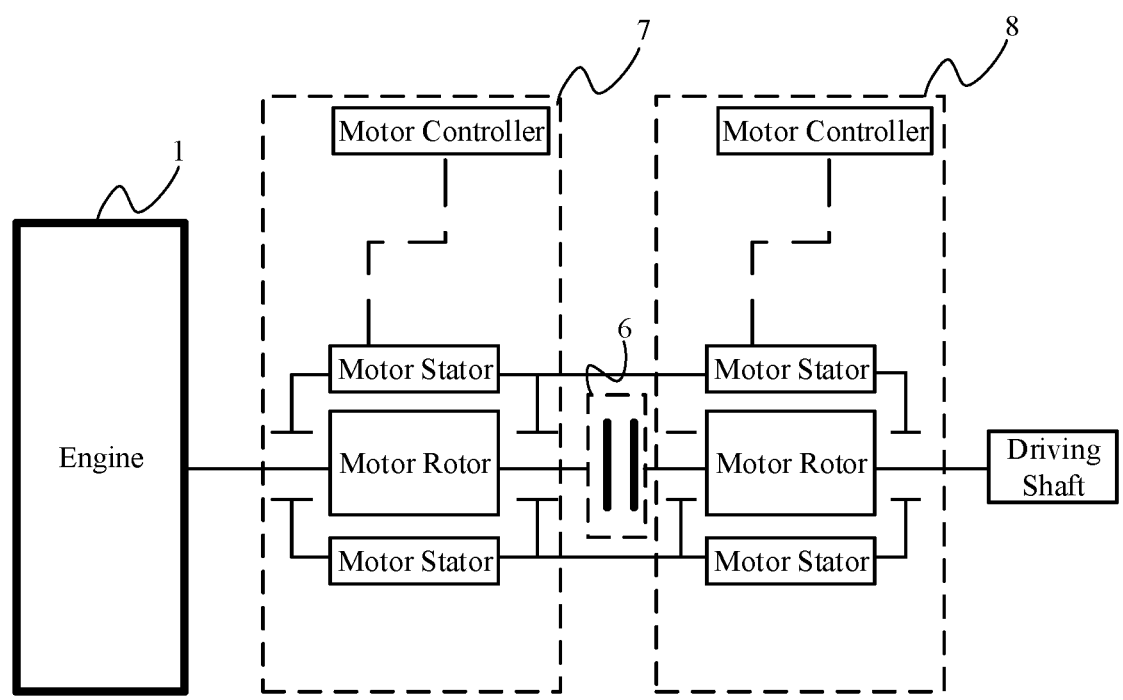

Referring to FIG. 4, it shows a hybrid system solution in the conventional art. The solution mainly includes an engine 1, a generator 7, a clutch 6, a driving motor 8, and etc. The generator 7 is directly connected to the engine 1. The engine 1 configured to perform direct driving, joint driving and parking for electricity generation of the vehicle; the generator 7 is configured to start engine 1 and perform electricity generation and driving. The clutch 6 is configured to control engagement and disengagement of the generator and driving motor; the driving motor 8 is configured to directly drive the vehicle to travel, and to be responsible for kinetic energy recovery of the vehicle.

During a start process of the engine 1, the generator drives the engine 1 to start; when the vehicle is parked, the clutch is disengaged, the generator and the engine 1 rotate at the same speed, and the rotation speed of the driving motor is 0 rpm; during a start-up process or a travelling process of the vehicle, the clutch is disengaged, the rotation speed of the driving motor starts to increase from 0 rpm, the rotation speed of the motor is proportional to the speed of the vehicle; the engine 1 and the generator are involved in driving (the clutch is engaged) according to a strategy; during a braking process of the vehicle, the clutch is disengaged, it is common that the engine 1 is stopped, so the rotation speed of the generator is 0 rpm, and the rotation speed of the driving motor is gradually decreased to 0 rpm; when the vehicle is reversing, the clutch is disengaged, and the driving motor rotates reversely.

In addition, there are hybrid systems including a planetary row and other structures.

The hybrid power system in FIG. 4 includes the engine 1, the clutch and two sets of motors. The assembly has many pieces, which causes the assembly is relatively long in size, complicated in control and relatively high in overall cost. The rotation speed and torque of the first motor during operation are in the first quadrant (only used in the process of starting engine 1) and the fourth quadrant; the rotation speed and torque of the second motor during operation are in the first, the third and the fourth quadrants.

Figure 5:
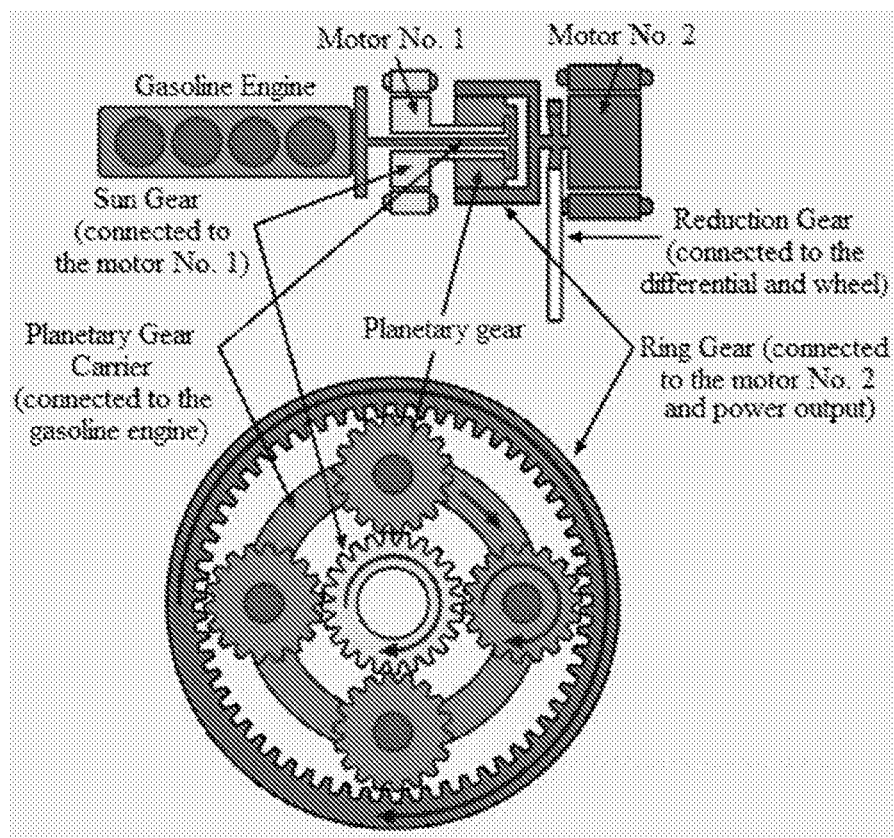

In addition, reference is made to FIG. 5, which shows a hybrid system including a planetary gear carrier and other structures in the conventional art. The hybrid system includes a gasoline engine, a motor No. 1, a motor No. 2, a sun gear, a reduction gear, planetary gears, a planetary gear carrier, a ring gear, and etc. A control process of the hybrid system shown in FIG. 5 is similar to the system shown in FIG. 4.

From FIG. 2 to FIG. 5, it can be found that the structure of the hybrid power system in the conventional art is relatively complicated, and in the actual application process, the motor may run at zero speed or in a low-speed range under certain working conditions, and performance such as efficiency and torque response of the motor are poor in these ranges.

In view of this, the embodiments of the present application provide a hybrid power system, which is applied to a motor vehicle. The hybrid power system includes an engine and a motor; the motor includes a motor rotor, a motor stator, and a motor controller; an output shaft of the engine is connected to a center shaft of the motor rotor; two ends of the center shaft of the motor rotor are respectively connected to a motor bearing for supporting the motor rotor; the motor controller is connected to the motor stator, and is configured to provide a driving current for the motor stator; the motor stator is connected to a driving shaft of the motor vehicle through a transmission mechanism, so that when the driving shaft rotates, the motor stator is driven to rotate; the motor is configured to determine an output torque according to a rotation speed of the motor and transmit the output torque to the driving shaft; the rotation speed of the motor is equal to a difference between a rotation speed of the motor rotor and a rotation speed of the motor stator.

The hybrid power system includes the engine and the motor; the motor stator of the motor is connected to the driving shaft of the motor vehicle through the transmission mechanism, so that the motor stator may also rotate relative to the chassis or other structures of the motor vehicle, so that the hybrid power system including the engine and the motor can meet the application of various operating conditions such as starting, idling, forward travelling and reversing of the motor vehicle, which greatly reduces the number of parts and components of the hybrid power system, thereby simplifying the overall structure of the hybrid power system and reducing the failure points of the hybrid power system.

The technical solutions according to the embodiments of the present application will be described clearly and completely as follows in conjunction with the drawings in the embodiments of the present application. It is apparent that the described embodiments are only a part of the embodiments according to the present application, rather than all of the embodiments. Based on the embodiments of the present application, all other embodiments obtained without creative efforts by those of ordinary skill in the art shall fall within the protection scope of the present application.

Figure 6:
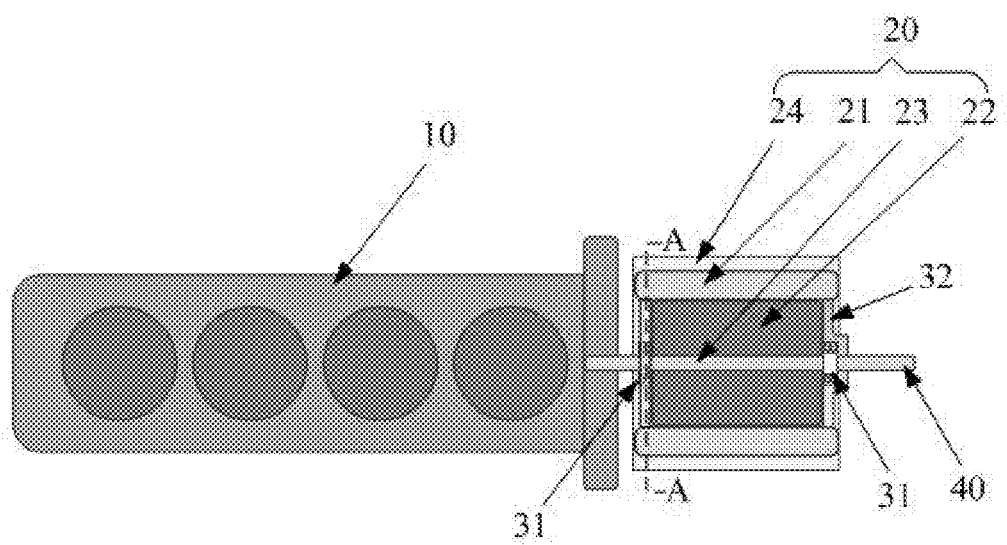
FIG. 6 is a schematic structural view of a hybrid power system provided according to an embodiment of the present application.
Figure 7:
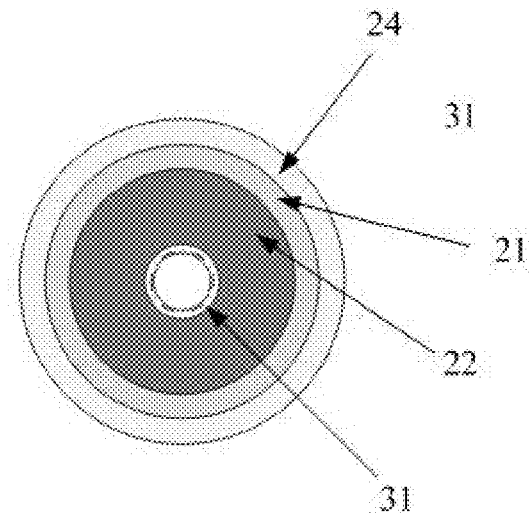
FIG. 7 is a schematic cross-sectional view of FIG. 6 along a line AA.

The embodiment of the present application provides a hybrid power system, which is applied to the motor vehicle, as shown in FIG. 6 and FIG. 7. FIG. 7 is a schematic cross-sectional view of FIG. 6 along the line AA. The hybrid power system includes an engine 10 and a motor 20; the motor 20 includes a motor rotor 22, a motor stator 21 and a motor controller; an output shaft of the engine 10 is connected to a center shaft 23 of the motor rotor 22, and two ends of the center shaft 23 of the motor rotor 22 are respectively connected to a motor bearing 31; the motor controller is connected to the motor stator 21; the motor stator 21 is connected to a driving shaft 40 of the motor vehicle through a transmission mechanism 32; the motor 20 is configured to determine an output torque according to a rotation speed of the motor 20, and transmit the output torque to the driving shaft 40; the rotation speed of the motor 20 is equal to a difference between a rotation speed of the motor rotor 22 and a rotation speed of the motor stator 21.

In an actual application process, the motor controller provides a driving signal for the motor stator 21, so that the motor 20 stator can determine and generate a driving magnetic field according to the driving signal; under the presence of the driving magnetic field, the motor rotor 22 may receive a driving force given by the driving magnetic field. At the same time, the motor rotor 22 may also receive the torque transmitted by the output shaft, connected to it, of the engine 10. The shaft rotates under the control of the torque transmitted. Due to the complicated operating conditions of motor vehicles, under certain operating conditions, the motor rotor 22 only rotates under the control of the driving magnetic field; under certain operating conditions, the motor rotor 22 only rotates under the control of the engine 10. In some working conditions, the motor stator 21 and the motor rotor 22 rotate under the common control of the driving magnetic field and the engine 10.

The two ends of the central shaft 23 of the motor rotor 22 are respectively connected with a motor bearing 31, and two motor bearings 31 are used for ensuring the support and relative rotation of the motor stator 21 and the motor rotor 22.

In an embodiment, still referring to FIG. 6, the transmission mechanism 32 is a flange plate.

The outer edge of the flange plate is detachably connected to the motor stator, and the connecting hole 323 of the flange plate is detachably connected to the driving shaft.

For example, the detachable connection between the outer edge of the flange plate and the stator of the motor and the detachable connection between the connecting hole of the flange plate and the driving shaft can be realized by means of gears, specifically: an internal gear 321 and an external gear 322 are provided on the flange plate; the internal gear 321 is arranged in the connecting hole 323 of the flange plate and cooperates with the gear structure on the driving shaft; the external gear 322 is arranged at the edge position of the flange plate and cooperates with the gear structure on the motor stator.

The motor stator and the outer edge of the flange plate are clamped or welded, and/or the connecting hole 323 of the flange plate and the driving shaft are clamped or welded.

Further, a groove is also provided on the flange plate; the groove is located on the side of the flange plate facing the motor rotor 22, and is used for arranging a motor bearing 31; the connecting hole 323 of the flange plate is arranged on the bottom of the groove for connecting with the driving shaft.

Further, in order to prevent the motor rotor from shaking during rotation, the two ends of the central shaft of the motor rotor are respectively in interference fit with an inner ring of the motor bearing.

Further, in order to facilitate users disassembling or installing the flange plate, the area, facing the groove, of the flange plate is of a protruding structure, and the radial cross section of the protruding structure is a non-circular cross section, for example, Rectangular structure or other structures that can be adapted to the wrench.

In an embodiment of the present application, since the motor stator 21 of the motor is connected to the driving shaft of the motor vehicle through the transmission mechanism 32, rather than connected to a fixed structure such as a chassis of the motor vehicle, the motor stator 21 may be rotatable relative to the chassis of the motor vehicle. Specifically, since the motor stator 21 is connected to the driving shaft 40, the motor stator 21 may receive a torque signal transmitted by the driving shaft 40 under certain working conditions. In addition, the motor stator 21 may further receive the driving signal and generate a driving magnetic field. The driving magnetic field may drive the motor rotor 22 to rotate, besides that, the rotation of the motor rotor 22 may generate a driving force on the motor stator 21 that generates the driving magnetic field. Therefore, the motor stator 21 is configured to rotate under the control of the torque signal transmitted by the driving shaft 40 and/or a rotation state of the motor rotor 22. That is, in certain working conditions, the motor stator 21 only rotates under the control of the torque signal transmitted by the driving shaft 40; in certain operating conditions, the motor stator 21 only rotates under the control of the rotation state of the motor rotor 22; in certain working conditions, the motor stator 21 rotates under the joint control of the torque signal transmitted by the driving shaft 40 and the rotation state of the motor rotor 22.

Generally, the driving signal received by the motor stator 21 includes a driving current signal and a driving voltage signal.

On the basis of the above embodiments, in an embodiment of the present application, still referring to FIG. 6, the hybrid power system further includes: a motor casing 24 encapsulating the motor stator 21 and the motor rotor 22 together, and the motor casing 24 is fixedly connected to the chassis of the motor vehicle.

The motor casing 24 is configured to provide protection for the motor stator 21 and the motor rotor 22, and to improve the integration of the motor 20 at the same time.

On the basis of the above embodiments, in another embodiment of the present application, in a case that the motor vehicle is a two-wheel drive motor vehicle, the driving shaft 40 is a rear axle or a front axle of the motor vehicle.

In a case that the driving shaft 40 is the rear axle of the motor vehicle, the motor vehicle is a rear drive vehicle.

In a case that the driving shaft 40 is the front axle of the motor vehicle, the motor vehicle is a front drive vehicle.

On the basis of the above embodiments, in another embodiment of the present application, in a case that the motor vehicle is a four-wheel drive motor vehicle, the driving shaft 40 is an input end of a differential lock of the motor vehicle.

In a four-wheel drive motor vehicle, a front axle and a rear axle are connected through a differential lock, and the hybrid power system is connected to the input end of the differential lock to provide driving force for the transmission system of the motor vehicle.

The hybrid power system includes the engine 10 and the motor 20. The motor stator 21 of the motor is connected to the driving shaft of the motor vehicle through the transmission mechanism 32, so that the motor stator 21 may be rotatable relative to the chassis or other structures of the motor vehicle, and the hybrid power system including the engine 10 and the motor 20 can meet the application of various working conditions such as starting, idling, forward travelling and reversing of the motor vehicle, which greatly reduces the number of parts and components of the hybrid power system, thereby simplifying the overall structure of the hybrid power system, and reducing failure point of the hybrid power system.

Control logic of the hybrid power system provided according to the embodiments of the present application will be briefly described below.

In all operating conditions of the motor vehicle, the hybrid power system satisfies the following conditions:

rotation speed of driving shaft 40: $n_{Veh} = n_{Eng} - n_{TM}$;

torque of driving shaft 40: $T_{Veh} + T_a = T_{Eng} = T_{TM}$;

where:
$n_{Veh}$ is the rotation speed of the driving shaft 40 of the motor vehicle (which is proportional to the speed of the motor vehicle);
$n_{Eng}$ is the rotation speed of the engine 10 of the motor vehicle;
$n_{TM}$ is the rotation speed of the motor 20 (the speed of the motor rotor 22 relative to the motor stator 21);
$T_{Veh}$ is the resistance torque of the motor vehicle, which is obtained by calculating a wind resistance and a friction resistance of the motor vehicle;
$T_a$ is the accelerating torque of the motor vehicle, that is, the remaining torque after the power system overcomes the resistance torque;
$T_{Eng}$ is the net output torque of the engine 10;
$T_{TM}$ is the output torque of the motor 20.

Specifically, in a case that the motor vehicle is parked:
a) in a case that the engine 10 is stopped, the rotation speed of the motor 20 is 0 rpm;
b) in a case that the engine 10 is idling, the rotation speed of the engine 10 is $n_{Eng0}$, the rotation speed of the motor 20 $n_{TM0} = n_{Eng0}$, the torque of the motor 20 is equal to the net output torque of the engine 10, that is $T_{Eng0} = T_{TM0} = 0$ N·m;
c) the engine 10 is parked to generate electricity; the rotation speed of the engine 10 is $n_{Eng1}$, the rotation speed of the motor 20 is $n_{TM1} = n_{Eng1}$; the torque of the motor 20 is equal to the net output torque of the engine 10, that is, $T_{Eng1} = T_{TM1}$, since the motor vehicle is parked, the vehicle speed $n_{Veh1} = 0$. Due to the interaction force, a fixed torque of the motor stator 21 is provided by the driving shaft 40 at this time, that is, $T_{Veh1} = T_{TM1} \neq 0$, the torque required by the motor stator 21 is provided by the driving shaft 40 through the wheel braking system.

Figure 8:
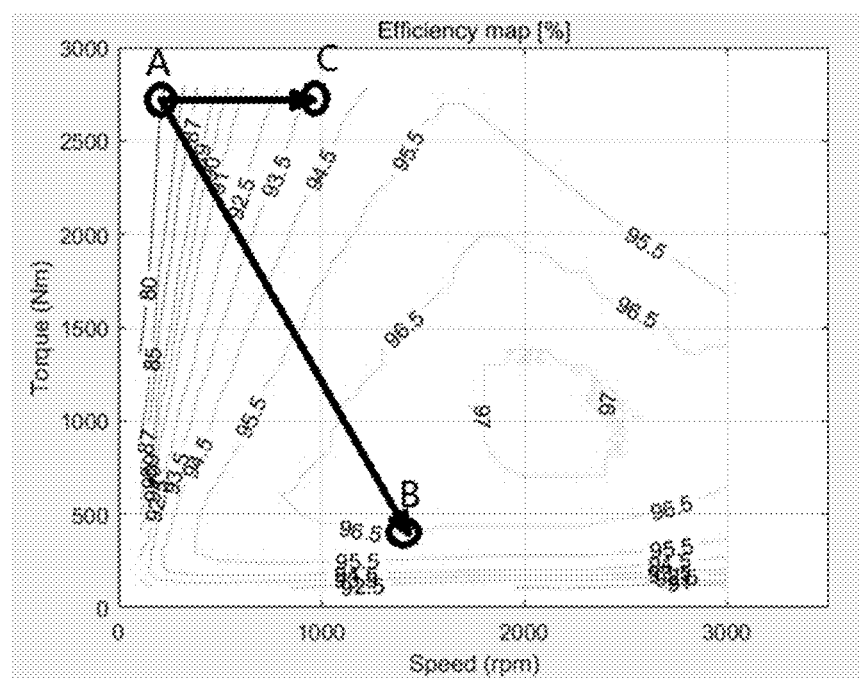
FIG. 8 is a schematic view of motor efficiency provided according to an embodiment of the present application.
Figure 9:
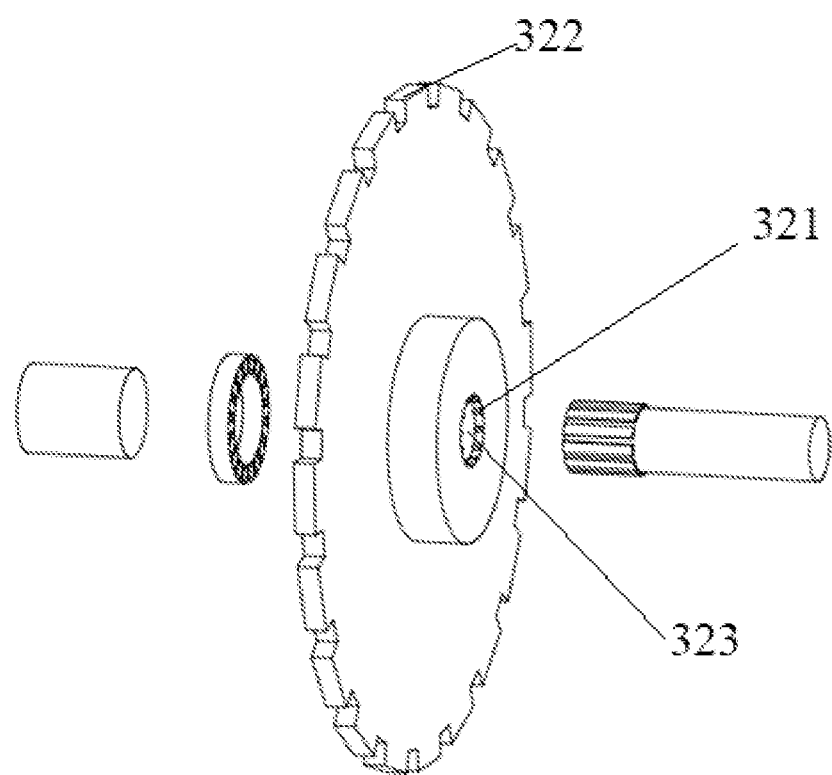
FIG. 9 is an exploded view showing a flange plate according to an embodiment of the present application.

During a start-up and travelling process of the motor vehicle:
a) the speed of the motor vehicle starts from 0, the speed of the motor 20, that is, the speed of the motor 20 starts from the speed of the engine 10. The rotation speed of the engine 10 and the motor 20 may be adjusted during the start-up and travelling process, so that the engine 10 and the motor 20 in the system are within a desirable working range; as shown in FIG. 8, the working point of the motor 20 may be moved from A to B during the start-up process. When the vehicle is started, the efficiency of the motor 20 may be directly increased from lower than 80% to higher than 96%, which improves the system efficiency. At the same time, since the torque of the motor 20 is greatly reduced, heat generated by the motor 20 is also greatly reduced, which has a significant cooling effect on the motor 20. (The heat generated by the motor 20 is positively correlated with the torque of the motor 20); in FIG. 8, the horizontal axis represents the speed of the motor 20, in rpm; the vertical axis represents the torque of the motor 20, in N·m.

b) as for travelling electricity generation function, the motor 20 adopts redundant power of the engine 10 (that is, the power of the engine 10 excluding the power used for the traveling of the motor vehicle) for travelling electricity generation.

During a braking process of the motor vehicle:

the rotation speed of the motor vehicle is reduced from $n_{Veh1} \neq 0$ according to a speed relationship $n_{Veh} = n_{Eng} - n_{TM}$, until $n_{Veh} = 0$, that is, the rotation speed of the motor 20 is equal to the rotation speed of the engine 10. Since the rotation speed of the motor 20 and the vehicle speed are no longer in a fixed proportional relationship, during the braking process, the rotation speed of the motor 20 may be adjusted to provide greater braking power, that is, the working point of the motor 20 is moved from A to C in FIG. 7, and the braking power may be improved by several times. The working point of the motor 20 may also be moved from A to B, and in a premise of providing the same braking power, the efficiency of the motor 20 is significantly improved and heat generated by the motor 20 is reduced. Refer to formula (1) for the relationship between the power, the rotation speed and the torque during braking;

$$P = n_{TM} \times T_{TM} / 9550 \qquad (1)$$

where P represents the power of the motor 20.

Correspondingly, a motor vehicle is further provided according to an embodiment of the present application, and the motor vehicle includes the hybrid power system as described in any of the above embodiments.

In summary, a hybrid power system is provided according to the embodiments of the present application, where the hybrid power system includes the engine 10 and the motor 20; the motor stator 21 of the motor 20 is directly in a rigid connection with the driving shaft 40 of the motor vehicle, so that the motor stator 21 may also rotate relative to the chassis or other structures of the motor vehicle, so that the hybrid power system including the engine 10 and the motor 20 can meet the application of various operating conditions such as starting, idling, forward travelling and reversing of the motor vehicle, which greatly reduces the number of parts and components of the hybrid power system, thereby simplifying the overall structure of the hybrid power system.

Further, in the hybrid power system provided according to the embodiments of the present application, the speed of the motor 20 does not increase from zero during a start-up process of the vehicle, the torque response and the efficiency characteristics of the motor 20 are desirable. Four quadrants of working area of the motor 20 are fully utilized to achieve the stepless adjustment of speed, and the hybrid power system can significantly improve the reliability and economy of the system.

The above embodiments are described in a progressive manner. Each of the embodiments is mainly focused on describing its differences from other embodiments, and reference may be made among these embodiments with respect to the same or similar parts.

The above illustration of the disclosed embodiments can enable those skilled in the art to implement or use the present application. Various modifications to the embodiments are apparent to the person skilled in the art, and the general principle herein can be implemented in other embodiments without departing from the spirit or scope of the present application. Therefore, the present application is not limited to the embodiments described herein, but should be in accordance with the broadest scope consistent with the principle and novel features disclosed herein.

The invention claimed is:

1. A hybrid power system, applied to a motor vehicle, wherein the hybrid power system comprises an engine and a motor; the motor comprises a motor rotor, a motor stator, and a motor controller; wherein
   an output shaft of the engine is connected to a center shaft of the motor rotor; two ends of the center shaft of the motor rotor are respectively connected to a motor bearing for supporting the motor rotor;
   the motor controller is connected to the motor stator, and is configured to provide a driving current for the motor stator;
   the motor stator is connected to a driving shaft of the motor vehicle through a transmission mechanism, so that when the driving shaft rotates, the motor stator is driven to rotate;
   the motor is configured to determine an output torque according to a rotation speed of the motor and transmit the output torque to the driving shaft; the rotation speed of the motor is equal to a difference between a rotation speed of the motor rotor and a rotation speed of the motor stator,
   wherein the transmission mechanism is a flange plate,
   wherein an internal gear and an external gear are provided on the flange plate;
   the internal gear is provided in a connecting hole of the flange plate to cooperate with a gear structure on the driving shaft;
   the external gear is provided on an edge position of the flange plate to cooperate with a gear structure on the motor stator.

2. The system according to claim 1, wherein the motor stator is clamped on or welded to the edge position of the flange plate, and/or the connecting hole of the flange plate is clamped on or welded to the driving shaft.

3. The system according to claim 1, wherein the two ends of the center shaft of the motor rotor are respectively in interference fit with an inner ring of the motor bearing.

4. The system according to claim 1, wherein a motor casing of the motor is fixedly connected to a chassis of the motor vehicle.

* * * * *